US011538265B2

United States Patent
Krauthamer

(10) Patent No.: US 11,538,265 B2
(45) Date of Patent: Dec. 27, 2022

(54) ORIENTATION TAG FOR PROVIDING ORIENTATION INFORMATION

(71) Applicant: Universal City Studios LLC, Universal City, CA (US)

(72) Inventor: Akiva Meir Krauthamer, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 426 days.

(21) Appl. No.: 16/816,050

(22) Filed: Mar. 11, 2020

(65) Prior Publication Data

US 2021/0286986 A1 Sep. 16, 2021

(51) Int. Cl.
*G06V 40/10* (2022.01)
*G06K 19/06* (2006.01)
*G06V 10/00* (2022.01)
*G06T 7/70* (2017.01)

(52) U.S. Cl.
CPC ..... *G06V 40/103* (2022.01); *G06K 19/06028* (2013.01); *G06K 19/06037* (2013.01); *G06T 7/70* (2017.01); *G06V 10/00* (2022.01)

(58) Field of Classification Search
CPC .............. G06V 40/103; G06V 10/00; G06K 19/06028; G06K 19/06037; G06T 7/70; A63F 13/5258; A63F 13/65; A63F 13/213
See application file for complete search history.

(56) References Cited

U.S. PATENT DOCUMENTS

| | | | |
|---|---|---|---|
| 6,729,544 B2 | 5/2004 | Navon | |
| 8,425,313 B2 | 4/2013 | Nelson et al. | |
| 10,733,960 B2 * | 8/2020 | Southworth | ....... G06K 7/10722 |
| 2003/0032478 A1 * | 2/2003 | Takahama | ............. A63F 13/219 463/30 |
| 2010/0155464 A1 | 6/2010 | Swayn et al. | |

(Continued)

FOREIGN PATENT DOCUMENTS

EP 3452991 A1 3/2019

OTHER PUBLICATIONS

PCT/US2021/021548 International Search Report and Written Opinion dated Jun. 8, 2021.

(Continued)

*Primary Examiner* — Sonji N Johnson
(74) *Attorney, Agent, or Firm* — Fletcher Yoder, P.C.

(57) ABSTRACT

An orientation tag provides orientation information and, by affixing the orientation tag to an object, orientation information of the object. The orientation tag displays different orientation information based on viewing the orientation tag at different angles. In particular, the orientation tag displays an angle and direction that the orientation tag is rotated about a horizontal axis relative to a viewer, and an angle and direction that the orientation tag is rotated about a vertical axis relative to the viewer. Viewing the orientation tag enables determining an angle and direction (e.g., depth information) that the orientation tag is rotated about a depth axis relative to the viewer. The orientation information and the depth information facilitate determining the orientation of the orientation tag in three dimensions. An output device outputs a user interactive experience based on the orientation information and the depth information provided by the orientation tag.

21 Claims, 8 Drawing Sheets

(56) References Cited

U.S. PATENT DOCUMENTS

| | | | |
|---|---|---|---|
| 2015/0258431 A1* | 9/2015 | Stafford | A63F 13/212 463/31 |
| 2016/0225156 A1* | 8/2016 | Ikenoue | G06T 7/73 |
| 2018/0329215 A1* | 11/2018 | Kake | G09G 5/00 |
| 2022/0113541 A1* | 4/2022 | Heyse | G02B 27/0179 |

OTHER PUBLICATIONS

Yuan Tailing et al., "Two-Layer QR Codes", IEEE Transactions On Image Processing, Sep. 1, 2019 (Sep. 1, 2019), pp. 4413-4428, vol. 28, No. 9, IEE Service Center, Piscataway, NJ.

Hideyuki Tanaka et al., "A Visual Marker For Precise Pose Estimation Based On Lenticular Lenses", 2012 IEEE International Conference on Robotics and Automation (ICRA), May 14, 2012 (May 14, 2012), pp. 5222-5227, RiverCentre, Saint Paul, MN.

\* cited by examiner

ORIENTATION TAG FOR PROVIDING ORIENTATION INFORMATION

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

In entertainment venues, user interactive devices, including handheld objects, head-mounted devices, clothing, and so on, may be used in coordination with other system components to activate interactive experiences. For example, a system may determine an orientation of a user interactive device using a gyroscope or accelerometer in the user interactive device, and the system may generate a user interactive experience based on the determined orientation. In the setting of a theme park, a patron may hold a toy sword, and, in response to determining the orientation of the toy sword, a system may display (e.g., on a display near the patron, on a virtual reality or augmented reality display) a fireball appearing to exit the toy sword. It is now recognized that there is a need for improved systems and methods for determining the orientation of user interactive devices to facilitate provision of appropriate responses to orientation of the user interactive devices and/or data associated with the user interactive devices.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an orientation detection system includes an orientation detector having an image sensor and image processing circuitry. The orientation detection system also includes an orientation tag configured to be coupled to a user interactive device. The orientation tag includes a first layer of visual data, and a second layer of visual alignment features disposed over the first layer. The visual alignment features reveal and block portions of the visual data with respect to a viewpoint of the image sensor. The different patterns of the visual data are observable to the image sensor, and each of the different patterns correspond to a relative orientation of the orientation tag with respect to the viewpoint. The image processing circuitry identifies an orientation of the orientation tag based on a pattern of different patterns of the visual data observed by the image sensor.

In an embodiment, an entertainment system includes an orientation tag of a user interactive device. The orientation tag includes visual patterns and a visual alignment feature that limits viewing of the visual patterns based on viewing orientation of the orientation tag. The entertainment system also includes a camera that captures an image of the orientation tag of the user interactive device. The entertainment system further includes a controller having processing circuitry and a memory, which stores machine-readable instructions that cause the processing circuitry to identify the orientation tag of the user interactive device in the image and determine an orientation of the orientation tag based on orientation information associated with a visual pattern captured in the image.

In an embodiment, a user interactive device includes an orientation tag having a first layer that includes patterns. Each pattern indicates a set of orientation information. The orientation tag also has a second layer disposed over the first layer that includes elements that enable a corresponding pattern corresponding to a viewpoint of the orientation tag to be viewed from the viewpoint, and prevent patterns not corresponding to the viewpoint of the orientation tag from being viewed from the viewpoint.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
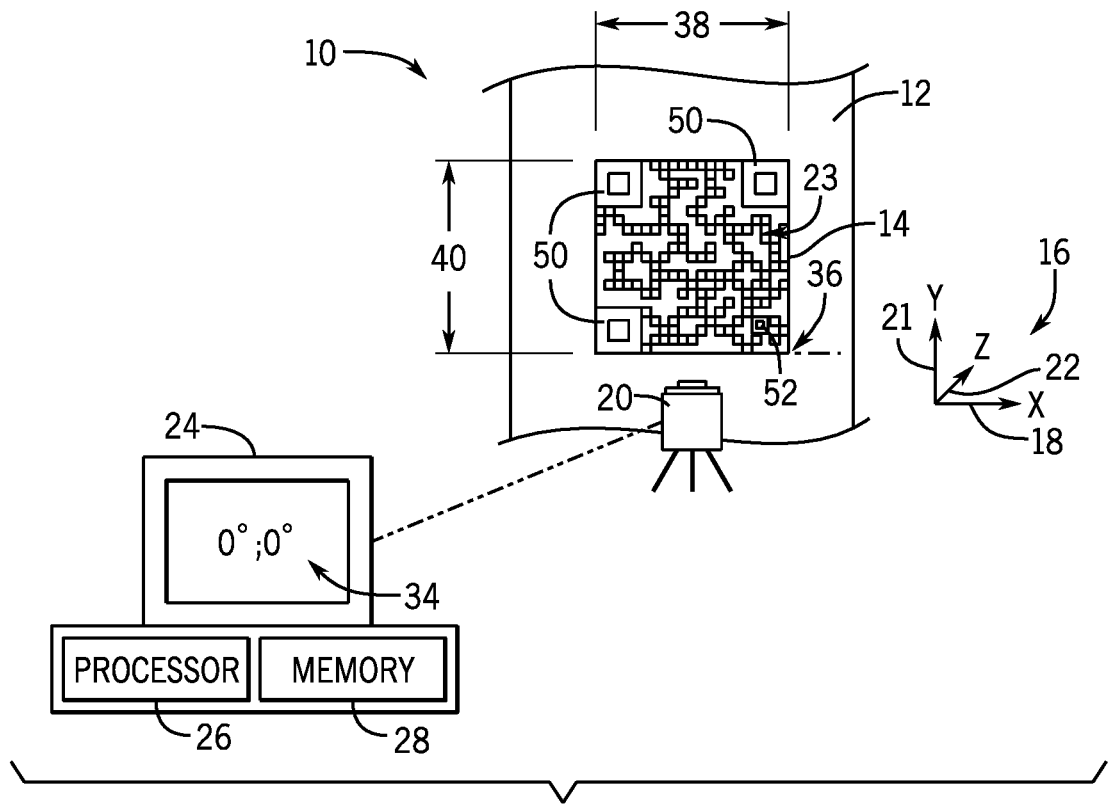
FIG. 1 is a schematic diagram of a front perspective view of a theme park attraction system including a user interactive device having an orientation tag in a first orientation, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In entertainment venues, user interactive devices, including handheld objects, head-mounted devices, clothing, and so on, may be used in coordination with other system components to activate interactive experiences. For example, an interactive device may include an image of a pattern or code (e.g., a Quick Response (QR) Code®) that can be detected to identify orientation information (e.g., horizontal and vertical orientation information) based on the pattern or code in a captured view of the image. For example, the QR Code® includes three finder patterns and an alignment pattern that may be used to determine how the QR Code® is rotated. An output device (e.g., a display) may then output a user interactive experience (e.g., video data) based on the orientation information (e.g., where the user interactive device is aimed). However, the pattern or code may be prone to error due to partial occlusion, lighting changes, excessive distance from an image capture device (e.g., a camera), small angular changes, and so on.

The present disclosure relates generally to an orientation tag or marker that displays orientation information (e.g., corresponding to angular orientation) of the orientation tag based on a viewpoint of a viewer. That is, the orientation tag displays different orientation information at different viewer viewpoints to enable a detection system to determine the orientation of the orientation tag. The orientation tag may also block or prevent other orientation information (e.g., corresponding to other viewpoints) from being viewed by the viewer. Detected aspects of the orientation tag may provide orientation information about the orientation tag itself and, by coupling or affixing the orientation tag to an object, orientation information of the object may likewise be detected. The orientation information may include an angle that the orientation tag is rotated about a horizontal axis relative to a viewer, and an angle that the orientation tag is rotated about a vertical axis relative to the viewer. For example, if the orientation tag is viewed "straight on" (e.g., such that the orientation tag is rotated 0° about the horizontal axis relative to the viewer and rotated 0° about the vertical axis relative to the viewer), the orientation tag may display orientation information indicating rotation of 0° about the horizontal axis and 0° about the vertical axis. As another example, if the orientation tag is viewed such that it is rotated 20° in a clockwise direction about a horizontal axis relative to the viewer and rotated 70° in a counterclockwise direction about the vertical axis relative to the viewer, the orientation tag may display orientation information indicating rotation of 20° in the clockwise direction about the horizontal axis and 70° in the counterclockwise direction about the vertical axis.

Moreover, viewing the orientation tag may enable determining an angle that the orientation tag is rotated about a depth axis relative to the viewer. For example, pattern and/or image recognition techniques may be employed to identify the orientation tag in an image, and determine the angle that the orientation tag is rotated about the depth axis. The orientation information and the depth information facilitate determining the orientation of the orientation tag in three dimensions (e.g., with six degrees of freedom).

The orientation tag may display the different orientation information to different viewer viewpoints due to light field printing techniques, where a base layer is composed of multiple patterns, and each pattern indicates a set of orientation information. A mask layer may be disposed over the base layer that blocks or prevents other orientation information (e.g., corresponding to other viewpoints) from being viewed by the viewer. Based on viewing the orientation tag at certain horizontal and vertical rotational angles, the mask layer and base layer may enable viewing certain patterns indicating respective sets of orientation information corresponding to the certain horizontal and vertical rotational angles. In some embodiments, the mask layer may include blocking elements that block viewing of patterns other than a certain pattern, thus enabling viewing of the certain pattern indicating the set of orientation information corresponding to the certain horizontal and vertical rotational angles. In alternative or additional embodiments, the orientation tag may include a lens layer having lens elements that refract viewing of the patterns other than the certain pattern away from a viewer at the certain horizontal and vertical rotational angles, while refracting the certain pattern indicating the set of orientation information corresponding to the certain horizontal and vertical rotational angles to the viewer.

Because the orientation information is encoded in a pattern, rather than being derived from a perspective warp of a pattern, the orientation tag may be less prone to error due to partial occlusion, lighting changes, excessive distance from the camera, small angular changes, and so on. Thus, present embodiments may provide a more effective and efficient way to provide orientation information than merely using perspective warping. Moreover, because the orientation tag conveys orientation information passively (e.g., via static, instead of dynamic, components), the passive nature of the orientation tag may avoid using or reduce use of complex elements (e.g., an electronic display, communication circuitry), thus providing a cost-efficient way to provide orientation information. Indeed, the orientation tag may include an adhesive side to conveniently affix the orientation to any number of user interactive devices, thus enabling customers to, for example, purchase the orientation tag and affix it to a user interactive device of their choosing. It should be noted that present embodiments may employ layered patterning of the orientation tag in conjunction with perspective warping and communication circuitry.

In accordance with an embodiment of the present disclosure, a system may include cameras, processors, memory devices, and/or output devices that coordinate and are programmed to provide responses to the orientation of the orientation tag associated with use of a user interactive device. As an example, the user interactive device may be shaped like a sword on which the orientation tag is affixed, and the user may point the user interactive device at an animated object (e.g., a robot or otherwise animated figure) of an attraction, and, in response to determining that the orientation tag, and thus the user interactive device, is pointing at the animated object, the animated object may output a user interaction experience (e.g., falling down). As another example, the user interactive device may be a virtual reality headset on which the orientation tag is affixed, and the user may wear the user interactive device and move their head (e.g., left and right). In response, a display of the virtual reality headset may display video data corresponding to the user's head movement (e.g., providing the illusion that the user is looking around in a virtual world). As yet another example, the user interactive device may be the user's mobile communication device (e.g., a smartphone, cellphone, tablet, wearable device) on which the orientation tag is affixed (e.g., on the back of the user's mobile device or on a cover of the user's mobile device). An electronic display (e.g., mounted on a wall or an augmented reality display) may display a virtual object (e.g., a baseball bat) correlated to the user's mobile device, and swinging the mobile device around may cause the virtual object to swing around due to movement of the orientation tag.

By way of introduction, FIG. 1 is a schematic diagram of a front perspective view of a theme park attraction or entertainment system 10 including a user interactive device 12 having an orientation tag 14 in a first orientation, according to an embodiment of the present disclosure. In particular, the orientation tag 14 may display orientation information (e.g., corresponding to angular orientation) of the orientation tag 14 based on a viewpoint of a viewer, while blocking or preventing other orientation information (e.g., corresponding to other viewpoints) from being viewed by the viewer. The user interactive device 12 may be any suitable device for which tracking is desired (e.g., to provide a user interactive experience). For example, the user interactive device 12 may include a handheld device (e.g., sword, gun, mug, cup), a head-mounted device (e.g., helmet, hat, goggles), article of clothing (e.g., a vest, jacket, sleeve, glove, scarf), a wrist-mounted device (e.g., a watch), and the like. In some embodiments, the user interactive device 12 may be fixed in place, or mounted (though actuatable). For example, the user interactive device 12 may include animatronic figures of a theme park that have actuatable features (e.g., mouths that open and close, arms that move around). The orientation tag 14 may be coupled to the animatronic figure (e.g., a head or appendage of the animatronic figure) to, for example, track the position of the animatronic figure (e.g., to determine which direction the animatronic figure is facing). As another example, tracking the orientation tag 14 may enable tracking the animatronic figure (e.g., the head or appendage of the animatronic feature) to determine whether the animatronic figure has moved over time beyond an acceptable amount of error (e.g., due to wear and tear).

The orientation tag 14 may be affixed or attached to the user interactive device 12. For example, the orientation tag 14 may include an adhesive layer or back that enables the orientation tag 14 to be stuck to the user interactive device 12. In this manner, the orientation tag 14 may be provided or sold separately from the user interactive device 12, and subsequently be attached to any user interactive device 12 of a user's choosing. In some embodiments, the orientation tag 14 may be removably or temporarily affixed to the user interactive device 12, so that the orientation tag 14 may be re-affixed to another user interactive device 12. For example, the orientation tag 14 may be affixed and re-affixed using a magnetic backing to a magnetic portion or plate of a user interactive device 12, a removable vinyl backing, Velcro®, and so on. As another example, the user interactive device 12 may include a clear or transparent sleeve, in which the orientation tag 14 may be placed. While the orientation tag 14 is illustrated as flat, in some embodiments, the orientation tag 14 may be curved or angled. In some embodiments, the orientation tag 14 may follow a curve of the portion of the user interactive device 12 to which it is attached.

The orientation tag 14 may provide orientation information of the orientation tag 14 and, by affixing the orientation tag 14 to the user interactive device 12, orientation information of the user interactive device 12. The orientation tag 14 may include a light field that displays different orientation information based on viewing the orientation tag 14 at different angles. In particular, the orientation tag 14 may display an angle (e.g., a horizontal rotational angle) that the orientation tag 14 is rotated about a horizontal axis (e.g., along or parallel to the x-axis 18 illustrated on the coordinate axes 16) relative to a viewer, such as an image sensor or image capture device (e.g., a camera 20). The orientation tag 14 may also display an angle (e.g., a vertical rotational angle) that the orientation tag 14 is rotated about a vertical axis (e.g., along or parallel to the y-axis 21 illustrated on the coordinate axes 16) relative to the camera 20. For reference, the front perspective view of the theme park attraction system 10 is illustrated along a depth axis (e.g., along or parallel to the z-axis 22 illustrated on the coordinate axes 16) relative to the camera 20. As such, the orientation tag 14 may display orientation information (e.g., corresponding to angular orientation) of the orientation tag 14 based on a viewpoint of the camera 20.

As illustrated, the orientation tag 14 provides the orientation information in the form of a Quick Response (QR) Code® 23, though, in additional or alternative embodiments, the orientation information may be provided in any format, such as a barcode, pattern, text, and so on, that is suitable for capturing by the camera 20 in one or more images, and recognition by a controller 24 or control system. The controller 24 may include processing circuitry, such as one or more processors (illustrated and referred to in this disclosure as a single processor 26), and one or more memory or storage devices (illustrated and referred to in this disclosure as a single memory device 28). The processor 26 may execute software programs and/or instructions stored in the memory device 28 that facilitate determining the orientation of the orientation tag 14 and/or the user interactive device 12. Moreover, the processor 26 may include multiple microprocessors, one or more "general-purpose" microprocessors, one or more special-purpose microprocessors, and/or one or more application specific integrated circuits (ASICs). For example, the processor 26 may include one or more reduced instruction set computer (RISC) processors. Additionally, the processor 26 may include image processing and/or pattern recognition circuitry that is specially designed to efficiently process and/or recognize images (including the orientation tag 14) and/or data (including the orientation information) provided by the orientation tag 14 (e.g., in the form of text, a barcode, a QR Code® 23). The memory device 28 may store information such as control software, look up tables, configuration data, and so forth. The memory device 28 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium. The memory device 28 may store a variety of information and may be used for various purposes, such as instructions that facilitate determining the orientation of the orientation tag 14 and/or the user interactive device 12.

In particular, the processor 26 may perform image recognition techniques stored in the memory device 28 to identify the orientation tag 14 in an image of the user interactive device 12 captured by the camera 20. This may include comparing the image of the user interactive device 12 with tables of information or running algorithms (e.g., stored in the memory device 28) based on images of the orientation tag 14 to identify correlative positioning and identity information for the orientation tag 14. The processor 26 may then perform pattern recognition techniques (e.g., decoding techniques, text recognition techniques, objection recognition techniques) stored in the memory device 28 to determine the orientation information provided by the orientation tag 14. For example, the orientation tag 14 may be a certain shape (e.g., a square, a circle, a rectangle) of a certain color (e.g., white, black, blue), and the processor 26 may use image recognition techniques to identify the certain shape and certain color of the orientation tag 14. As another example, the orientation tag 14 may include a QR Code® 23 having one or more position markers and/or alignment markers. As such, the processor 26 may use pattern recognition techniques (e.g., QR Code® 23 recognition techniques) stored in the memory device 28 to identify the orientation tag 14 by identifying the orientation tag 14.

In some embodiments, the theme park attraction or orientation detection system 10 includes an orientation detector having the image sensor (e.g., the camera 20) and image processing circuitry. The image processing circuitry may implement the image recognition techniques and/or the pattern recognition techniques to identify the orientation tag 14 in an image of the user interactive device 12 detected by the image sensor, and/or determine the orientation information provided by the orientation tag 14. The image processing circuitry may execute instructions stored in the memory device 28, and/or be part of or separate from the controller 24.

Figure 2:
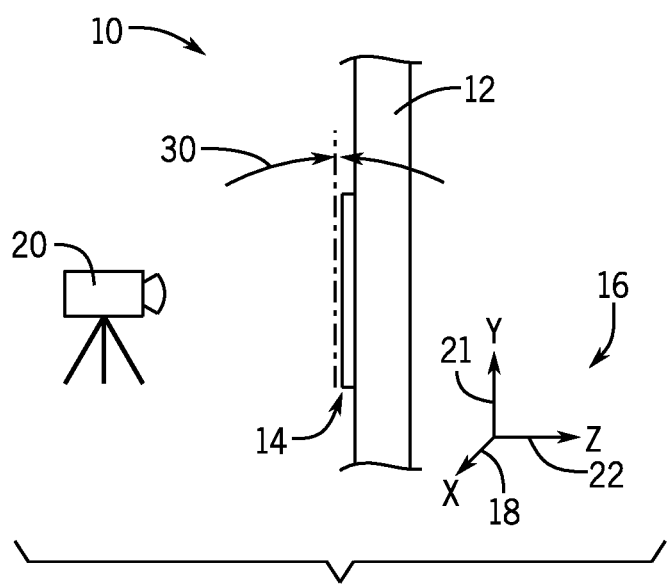
FIG. 2 is a schematic diagram of a side perspective view of a portion of the theme park attraction system of FIG. 1 including the user interactive device having the orientation tag in the first orientation, according to an embodiment of the present disclosure.
Figure 3:
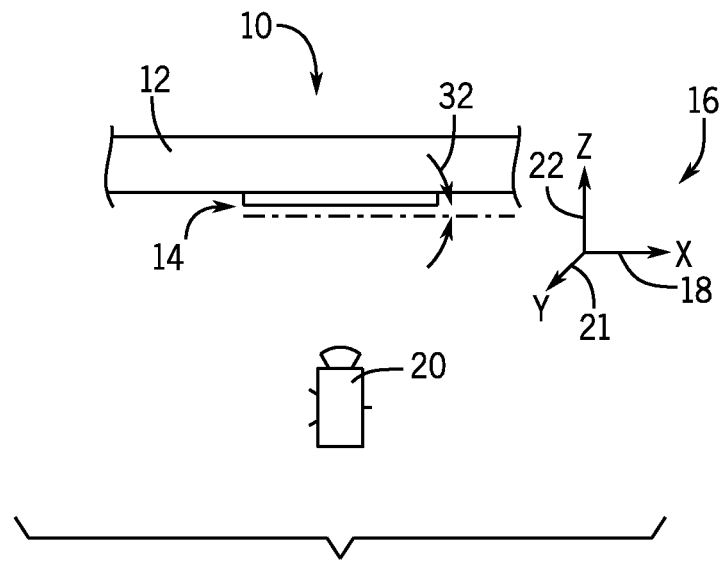
FIG. 3 is a schematic diagram of a top perspective view of a portion of the theme park attraction system of FIG. 1 including the user interactive device having the orientation tag in the first orientation, according to an embodiment of the present disclosure.

As illustrated, the camera 20 views the orientation tag 14 affixed to the user interactive device 12 "straight on", such that the orientation tag 14 is rotated 0° about the horizontal axis 18 (e.g., the horizontal rotational angle) relative to the camera 20 and rotated 0° about the vertical axis 21 (e.g., the vertical rotational angle) relative to the camera 20. For clarity, FIG. 2 is a schematic diagram of a side perspective view of a portion of the theme park attraction system 10 of FIG. 1 including the user interactive device 12 having the orientation tag 14 in the first orientation, according to an embodiment of the present disclosure. In particular, the side perspective view is illustrated along the horizontal axis 18 relative to the camera 20. As better illustrated, the orientation tag 14 is rotated 0° about the horizontal axis 18 (e.g., the horizontal rotational angle 30) relative to the camera 20. Similarly, FIG. 3 is a schematic diagram of a top perspective view of a portion of the theme park attraction system 10 of FIG. 1 including the user interactive device 12 having the orientation tag 14 in the first orientation, according to an embodiment of the present disclosure. In particular, the top perspective view is illustrated along the vertical axis 21 relative to the camera 20. As illustrated, the orientation tag 14 is rotated 0° about the vertical axis 21 (e.g., the vertical rotational angle 32) relative to the camera 20.

Turning back to FIG. 1, the orientation tag 14 displays the QR Code® 23, which encodes orientation information 34 that may include the horizontal rotational angle 30 (FIG. 2) and the vertical rotational angle 32 (FIG. 3) corresponding to the camera's view. In some embodiments, the orientation information 34 may also encode horizontal and vertical rotation directions (e.g., clockwise or counterclockwise). The camera 20 may capture and send an image of the orientation tag 14 to the controller 24. The processor 26 may identify and read the QR Code® 23 in the orientation tag 14 using pattern recognition techniques (e.g., QR Code® recognition techniques) stored in the memory device 28 to determine the orientation information 34. As illustrated, the processor 26 determines the orientation information 34 including the horizontal rotational angle 30 of 0° and the vertical rotational angle 32 of 0°.

In some embodiments, the memory device 28 may store the various sets of orientation information (e.g., QR Codes® 23) corresponding to the various horizontal rotational angles (e.g., 30) and vertical rotational angles (e.g., 32), and the processor 26 may compare images of the orientation information 34 to the various sets of orientation information to determine the horizontal rotational angles and vertical rotational angles. Additionally or alternatively, the orientation information 34 may be "directly" provided by the orientation tag 14 in a number and/or text format, such that decoding need not be performed by the processor 26. As such, the processor 26 may perform number and/or text recognition techniques to determine the horizontal rotational angles and vertical rotational angles.

Moreover, viewing the orientation tag 14 may enable determining an angle (e.g., a depth rotational angle) that the orientation tag 14 is rotated about a depth axis (e.g., illustrated on the coordinate axes 16 as the z-axis 22) relative to the camera 20. For example, pattern and/or image recognition techniques may be employed to identify the orientation tag in an image, and determine the angle that the orientation tag is rotated about the depth axis 22. As illustrated, the camera 20 views the orientation tag 14 affixed to the user interactive device 12 "straight on", such that the orientation tag 14 is rotated 0° about the depth axis 22 (e.g., the depth rotational angle 36).

The orientation information (e.g., the horizontal and vertical rotational angles 30, 32) and depth information (e.g., including the depth rotational angle 36) facilitate determining the orientation of the orientation tag 14 in three dimensions (e.g., with six degrees of freedom). For example, as mentioned above, the processor 26 determines the orientation information 34 including the horizontal rotational angle 30 of 0° and the vertical rotational angle 32 of 0° based on an image of the orientation tag 14 captured by the camera 20. The processor 26 may also determine the depth rotational angle 36 based on identifying the orientation tag 14 in the image (e.g., using image recognition techniques). As such, the processor 26 may determine the orientation of the orientation tag 14 using the horizontal, vertical, and depth rotational angles 30, 32, 36 (e.g., corresponding to the pitch, yaw, and roll of the orientation tag 14). Furthermore, the processor 26 may determine the size (e.g., width 38 and length 40) of the orientation tag 14 in the image (e.g., the number of pixels in the image correlating with the width 38 and length 40 of the orientation tag 14). Based on the known width 38 and length 40 of the orientation tag 14 and the number of correlating pixels, the processor 26 may determine the distance away that the camera 20 is from the orientation tag 14 (e.g., a depth measurement that may be part of the depth information), to facilitate determining both the orientation and the position of the orientation tag 14, and thus the orientation and the position of the user interactive device 12.

Figure 4:
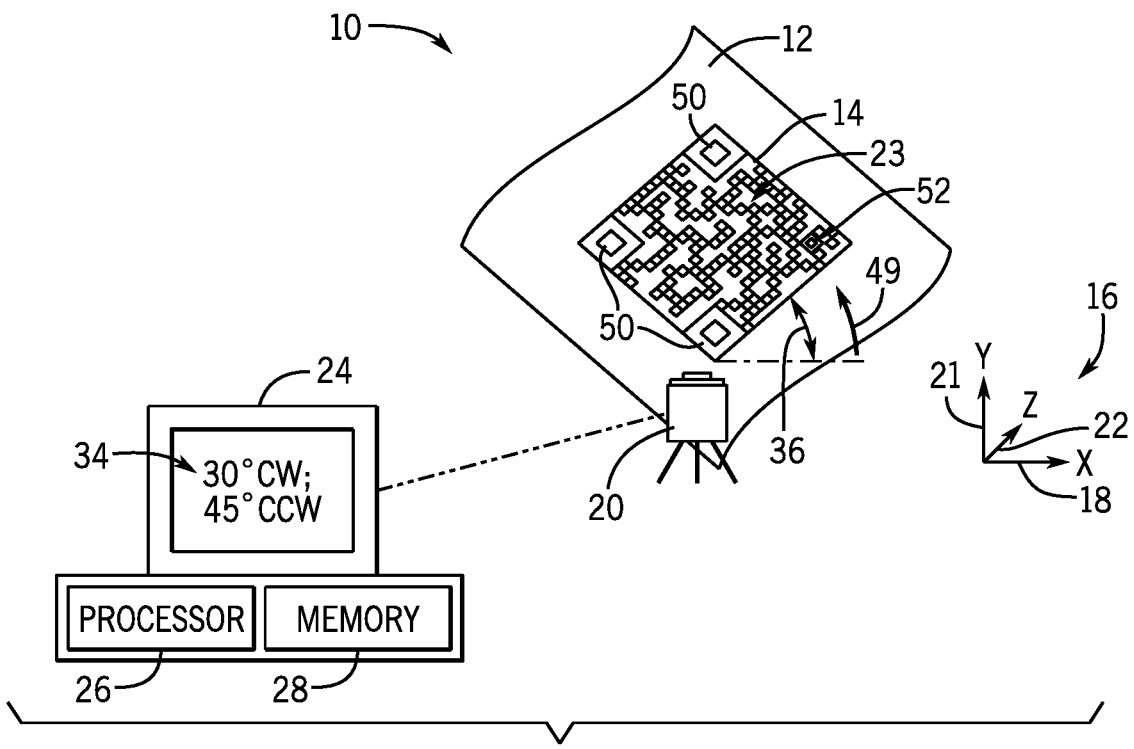
FIG. 4 is a schematic diagram of a front perspective view of the theme park attraction system of FIG. 1 including the user interactive device having the orientation tag in a second orientation, according to an embodiment of the present disclosure.

As another illustrative example, FIG. 4 is a schematic diagram of a front perspective view of the theme park attraction system 10 of FIG. 1 including the user interactive device 12 having the orientation tag 14 in a second orientation, according to an embodiment of the present disclosure. As illustrated, the user interactive device 12, and thus the orientation tag 14, is rotated at a depth rotational angle 36 of 45° in a counterclockwise direction (e.g., a depth rotational direction 49) about the depth axis 22 relative to the camera 20. As noted above, the processor 26 may determine the depth rotational angle 36 based on identifying the orientation tag 14 in an image of the user interactive device 12 having the orientation tag 14 captured by the camera 20 (e.g., using image recognition techniques). In some embodiments, the processor 26 may determine the depth rotational angle 36 of the orientation tag 14 based on one or more reference features of the orientation tag 14, and comparing the reference features to those of the orientation tag 14 when rotated 0° about the depth axis 22. For example, in FIG. 4, the orientation tag 14 is provided in the form of a QR Code® 23. As such, the processor 26 may identify the location of the three position markers 50 and/or the alignment marker 52 of the QR Code® 23 to determine how the orientation tag 14 is rotated with respect to when the orientation tag 14 is rotated 0° about the depth axis 22. The processor 26 may use pattern and/or image recognition techniques to identify such reference features of the orientation tag 14.

Figure 5:
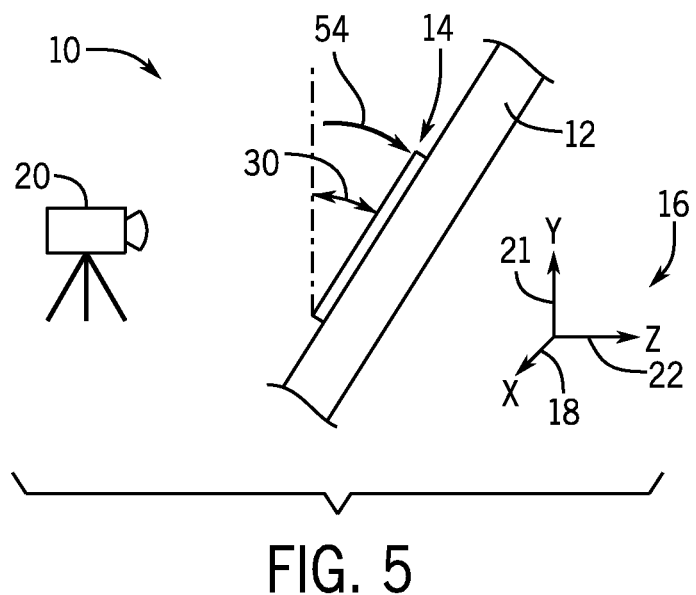
FIG. 5 is a schematic diagram of a side perspective view of a portion of the theme park attraction system of FIG. 1 including the user interactive device having the orientation tag in the second orientation, according to an embodiment of the present disclosure.
Figure 6:
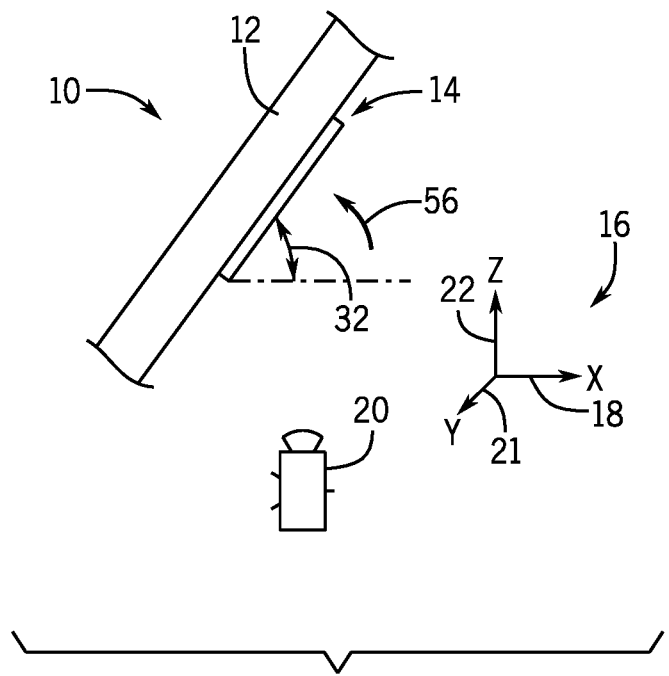
FIG. 6 is a schematic diagram of a top perspective view of a portion of the theme park attraction system of FIG. 1 including the user interactive device having the orientation tag in the second orientation, according to an embodiment of the present disclosure.

Moreover, FIG. 5 is a schematic diagram of a side perspective view of a portion of the theme park attraction system 10 of FIG. 1 including the user interactive device 12 having the orientation tag 14 in the second orientation, according to an embodiment of the present disclosure. In particular, the side perspective view is illustrated along the horizontal axis 18 relative to the camera 20. As illustrated, the orientation tag 14 is rotated 30° in a clockwise direction (e.g., a horizontal rotational direction 54) about the horizontal axis 18 (e.g., the horizontal rotational angle 30) relative to the camera 20. Similarly, FIG. 6 is a schematic diagram of a top perspective view of a portion of the theme park attraction system 10 of FIG. 1 including the user interactive device 12 having the orientation tag 14 in the second orientation, according to an embodiment of the present disclosure. In particular, the top perspective view is illustrated along the vertical axis 21 relative to the camera 20. As better illustrated, the orientation tag 14 is rotated 45° in a counterclockwise direction (e.g., a vertical rotational direction 56) about the vertical axis 21 (e.g., the vertical rotational angle 32) relative to the camera 20. The orientation information (e.g., the horizontal and vertical rotational angles 30, 32) and the depth information (e.g., including the depth rotational angle 36) facilitate determining the orientation of the orientation tag 14 in three dimensions (e.g., with six degrees of freedom).

In this manner, the orientation tag 14 may display different orientation information (e.g., corresponding to different angular orientation) at different viewer viewpoints to enable a detection system to determine the orientation of the orientation tag 14. That is, the orientation tag 14 may display information indicative of a relative orientation of the orientation tag 14 (e.g., relative to a viewpoint of the viewer). The orientation tag 14 may be made using any suitable material, format, and/or technique that enables providing or displaying different information or images depending on the different angles that the orientation tag 14 is viewed. While the present disclosure discusses the orientation tag 14 being made using light field printing techniques, it should be understood that other suitable techniques may be applicable as well, such as lenticular printing techniques, using a series of baffles to enable and block viewing of different images, and so on. Moreover, while FIGS. 1-6 illustrate the camera 20 viewing one orientation tag 14 of one user interactive device 12, and the controller 24 determining orientation information 34 for the one orientation tag 14 and/or the one user interactive device 12, in additional or alternative embodiments, the camera 20 may view multiple orientation tags 14 of multiple user interactive devices 12, and the controller 24 may determine orientation information 34 for the multiple orientation tags 14 and/or the multiple user interactive devices 12.

Figure 7:
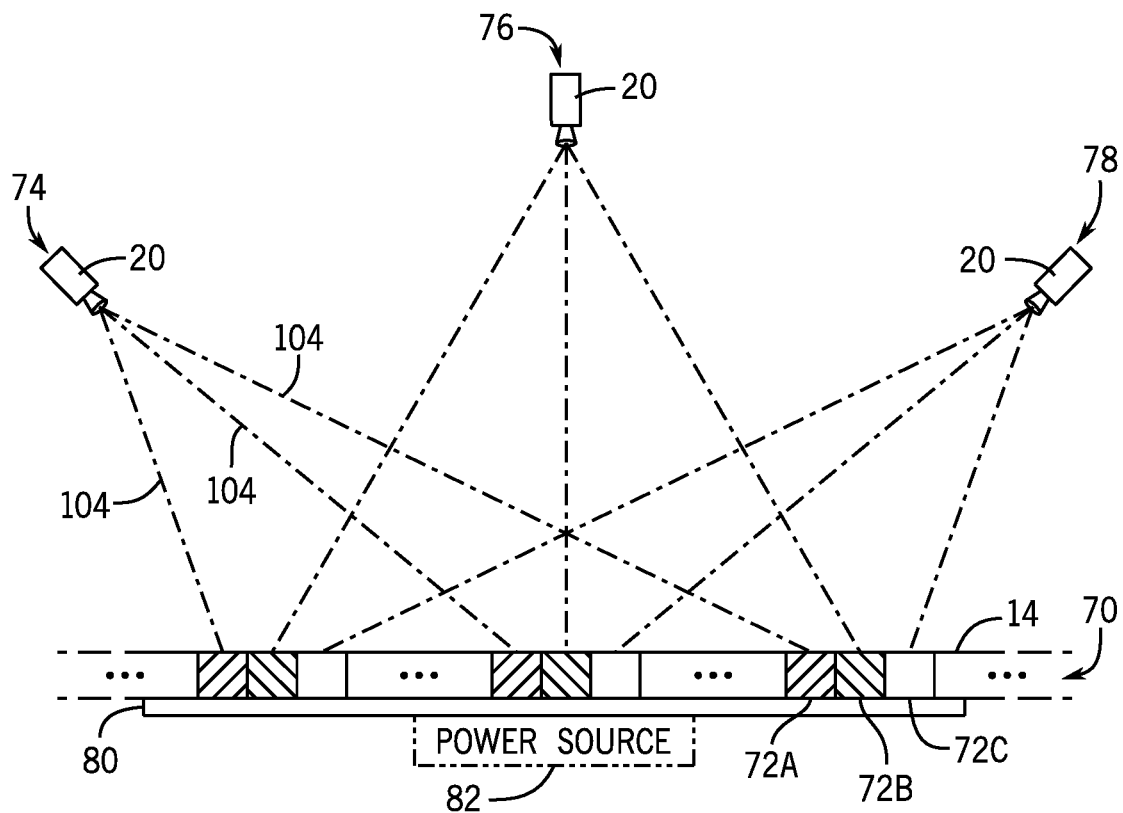
FIG. 7 is a schematic diagram of the orientation tag of FIG. 1 providing different orientation information based on different angles at which the orientation tag is viewed, according to an embodiment of the present disclosure.

FIG. 7 is a schematic diagram of the orientation tag 14 of FIG. 1 providing different orientation information 34 based on different angles at which the orientation tag 14 is viewed, according to an embodiment of the present disclosure. In particular, the orientation tag 14 may include a base layer 70 made of different visual data, such as in the form of multiple patterns (e.g., visual patterns) 72A-C (collectively referred to as element 72). Each pattern 72 may display a graphic or image that conveys the orientation information 34. For example, each pattern 72 may be a barcode, pattern, text, and so on, that is suitable for capturing by the camera 20 and identification by the controller 24. The patterns 72 may be interspersed, alternated, or arranged in the base layer 70 in a manner that enables a single pattern 72 that conveys the orientation information 34 to be viewable from a viewing angle that corresponds to the orientation information 34. Patterns not corresponding to the orientation information 34 may be blocked or prevented from being visible to a viewer (e.g., using visually blocking structures, refracting of visible light, baffle structures, collimated backlighting).

For example, patterns 72A-C are illustrated in FIG. 7, though it should be understood that any suitable number of patterns 72 may be included in the orientation tag 14. Indeed, the number of patterns 72 may be dependent on the resolution of a printer printing the orientation tag 14 and the size or surface area of the orientation tag 14. For example, for an orientation tag 14 that is 8 centimeters (cm) wide and 8 cm long, and a printer that has a resolution of 200 dots per cm (dpcm), the orientation tag 14 may provide approximately 1600×1600 (2,560,000) patterns, where each pattern corresponds to a different set of orientation information 34. The orientation tag 14 may be any suitable size that is convenient for affixing to the user interactive device 12, such as between 0.25 cm by 0.25 cm and 20 cm by 20 cm, including 8 cm by 8 cm, 5 cm by 8 cm, 5 cm by 5 cm, 3 cm by 3 cm, 10 cm by 8 cm, 10 cm by 10 cm, and so on. The resolution of the printer may include the resolution of inkjet printers (e.g., 120-285 dpcm), the resolution of laser printers (235-945 dpcm), or better.

As illustrated, when viewed from a first position 74 by the camera 20, the orientation tag 14 provides or displays the first pattern 72A. For example, the first position 74 may view the orientation tag 14 as rotated 15° in a clockwise direction about the horizontal rotational axis and rotated 170° in a clockwise direction about the vertical rotational axis. As such, the first pattern 72A may provide the orientation information 34 of a horizontal rotational angle 30 of 15°, a horizontal rotational direction 54 of clockwise, a vertical rotational angle 32 of 170°, and a vertical rotational direction 56 of clockwise.

When viewed from a second position 76 by the camera 20, the orientation tag 14 provides or displays the second pattern 72B. For example, the second position 76 may view the orientation tag 14 as rotated 5° in a counterclockwise direction about the horizontal rotational axis and rotated 20° in a clockwise direction about the vertical rotational axis. As such, the second pattern 72B may provide the orientation information 34 of a horizontal rotational angle 30 of 5°, a horizontal rotational direction 54 of counterclockwise, a vertical rotational angle 32 of 20°, and a vertical rotational direction 56 of clockwise.

When viewed from a third position 78 by the camera 20, the orientation tag 14 provides or displays the third pattern 72C. For example, the third position 78 may view the orientation tag 14 as rotated 60° in a clockwise direction about the horizontal rotational axis and rotated 140° in a counterclockwise direction about the vertical rotational axis. As such, the third pattern 72C may provide the orientation information 34 of a horizontal rotational angle 30 of 60°, a horizontal rotational direction 54 of clockwise, a vertical rotational angle 32 of 140°, and a vertical rotational direction 56 of counterclockwise. In this manner, the orientation tag 14 may display orientation information of the orientation tag 14 corresponding to a viewer viewpoint to a viewer (e.g., corresponding to a relative orientation of the orientation tag 14 relative to the viewer viewpoint), while blocking or preventing other orientation information (e.g., corresponding to other viewpoints) from being viewed by the viewer.

In some embodiments, the orientation tag 14 may include a light source 80 (e.g., collimated lighting) disposed below the base layer 70 that provides better visibility for the camera 20 to view the patterns 72. The light source 80 may include a light-reflecting device, such as retroreflective material (e.g., retroreflective sheeting, retroreflective fabric, retroreflective glass beads, microprisms, encapsulated lenses sealed onto a fabric or plastic substrate, and/or metal tape). As such, light entering the orientation tag 14 may be reflected back by the light source 80, causing the reflected light to illuminate the patterns 72 in the base layer 70. In additional or alternative embodiments, the light source 80 may be any suitable light-producing device that emits light to illuminate the patterns 72. For example, the light source 80 may include a light bulb, such as a liquid crystal display (LCD), light-emitting diode (LED) or an organic LED (OLED). In some embodiments, the light source 80 may include directional or collimated lights that direct a pattern 72 corresponding to a viewer viewpoint toward the viewer, while directing other patterns 72 corresponding to other viewpoints away from the viewer (e.g., such that the other patterns 72 are not visible by the viewer). The light source 80 may be battery-powered and/or rechargeable. In some embodiments, the orientation tag 14 and/or the user interactive device 12 may include a power source 82 (e.g., battery, capacitor, power harvesting circuitry) for this purpose. In some embodiments, the light source 80 may be a wireless-powered light (e.g., using ultra high frequency (UHF) power harvesting).

While the illustrated light source 80 emits light in the visible spectrum, in some embodiments, the light source 80 may emit light in a non-visible spectrum (e.g., infrared or ultraviolet spectrums), and, as such, the camera 20 may capture images of the orientation tag 14 using light in the non-visible spectrum. Using a light source 80 that emits light in the non-visible spectrum may prevent, for example, other patrons of a theme park from being distracted by the orientation tag 14, maintaining a superior theme park experience.

In some embodiments, the patterns 72 themselves may be provided by light-emitting devices (e.g., LCDs, LEDs, OLEDs). In additional or alternative embodiments, the orientation tag 14 and/or the user interactive device 12 may include of light-emitting devices that emit light in two or more different spectrums. For example, a first set of light-emitting devices may emit light in the visible spectrum, and a second set of light-emitting devices may emit light in the non-visible spectrum (e.g., infrared). This may enable more data to be transferred using the multiple sets of light-emitting devices. For example, the first set of light-emitting devices may provide patterns indicative of the horizontal rotational angle 30 and the horizontal rotational direction 54, and the second set of light-emitting devices may provide patterns indicative of the vertical rotational angle 32 and the vertical rotational direction 56. As another example, the first set of light-emitting devices may provide patterns indicative of the orientation information 34, and the second set of light-emitting devices may provide patterns indicative of identification information (e.g., an identification number, account number, user profile information, and so on, of the user interactive device 12).

In some embodiments, the patterns 72 and/or the base layer 70 may enable light from the light source 80 to pass therethrough. For example, the patterns 72 may be printed on the base layer 70 and/or the base layer 70 may include a filter or a screen (e.g., pass-through filters). As such, the images of the orientation tag 14 captured by the camera 20 may include images of the patterns 72 as printed on the filter and backlit by the light source 80. In additional or alternative embodiments, certain elements of each pattern 72 may be "offset" (e.g., aligned or directed differently) relative to others. In particular, as the viewing angle changes from a first viewpoint to a second viewpoint, a first set of elements of a pattern 72 may be viewed at the first viewpoint (while a second set of elements of the pattern 72 may not be viewed), and the second set of elements of the pattern 72 may be viewed at the second viewpoint (while the first set of elements of the pattern 72 may not be viewed). This may allow for higher fidelity or angular resolution relative to the camera 20, without increasing the fidelity or angular resolution (e.g., number of elements) of the pattern 72.

Figure 8:
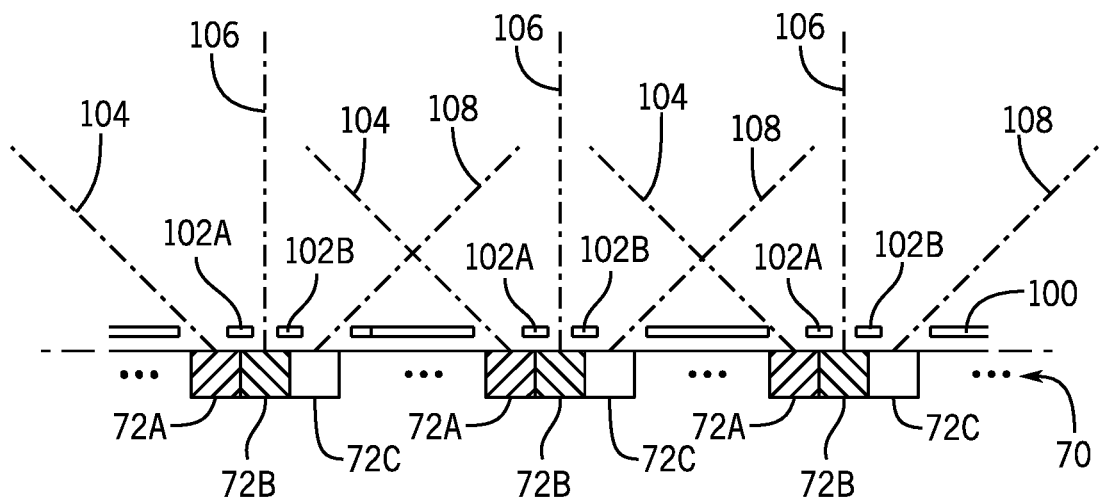
FIG. 8 is a schematic diagram of the orientation tag of FIG. 1 providing different orientation information based on different angles at which the orientation tag is viewed using a mask layer, according to an embodiment of the present disclosure.

In some embodiments, the orientation tag 14 may include a mask layer or visual alignment feature disposed over the base layer 70. The mask layer may enable viewing of or reveal, based on viewing the orientation tag 14 at certain horizontal and vertical rotational angles 30, 32, the pattern indicating the orientation information 34 corresponding to the certain horizontal and vertical rotational angles 30, 32. The mask layer may also block or limit viewing of other patterns (e.g., corresponding to other viewpoints) from, for example, the camera 20. FIG. 8 is a schematic diagram of the orientation tag 14 of FIG. 1 providing different orientation information 34 based on different angles at which the orientation tag 14 is viewed using a mask layer 100, according to an embodiment of the present disclosure. As illustrated, the mask layer 100 may include blocking elements 102 that block (e.g., physically block) viewing of patterns (e.g., 72B, 72C) other than the certain pattern (e.g., 72A) corresponding to the camera's viewpoint, thus enabling viewing of the certain pattern indicating the orientation information 34 corresponding to the camera's viewpoint.

For example, blocking or visual alignment elements 102A may block pattern 72B from the camera's view 104 (e.g., when the camera 20 is in the first position 74 as shown in FIG. 7), and blocking elements 102B may block pattern 72C from the camera's view 104, while enabling the camera's view 104 access to the pattern 72A. Similarly, the blocking elements 102A may block pattern 72A from the camera's view 106 (e.g., when the camera 20 is in the second position 76 as shown in FIG. 7), and blocking elements 102B may block pattern 72C from the camera's view 106, while enabling the camera's view 106 access to the pattern 72B. Moreover, the blocking elements 102A may block pattern 72A from the camera's view 108 (e.g., when the camera 20 is in a third position), and blocking elements 102B may block pattern 72B from the camera's view 108, while enabling the camera's view 108 access to the pattern 72C. In this manner, the blocking elements 102 may enable viewing of a pattern that communicates orientation information of the orientation tag 14 corresponding to a viewer viewpoint to a viewer, while blocking other orientation information (e.g., corresponding to other viewpoints) from being viewed by the viewer.

Figure 9:
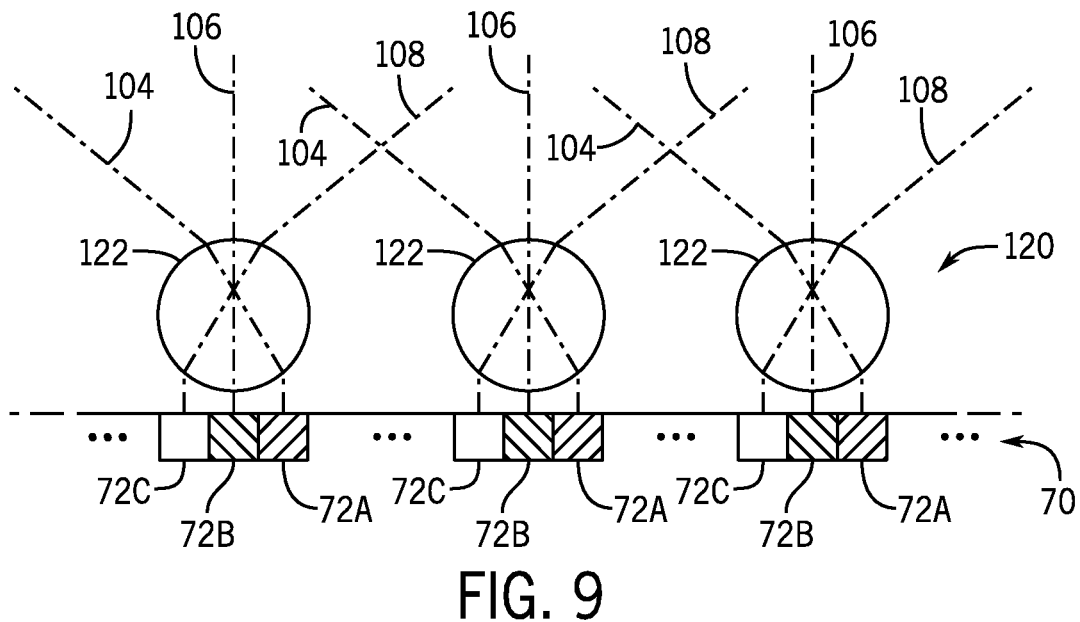
FIG. 9 is a schematic diagram of the orientation tag of FIG. 1 providing different orientation information based on different angles at which the orientation tag is viewed using a lens layer, according to an embodiment of the present disclosure.

In alternative or additional embodiments, the orientation tag 14 may include a lens or visual alignment layer disposed over the base layer 70, which enables viewing of or reveals, based on viewing the orientation tag 14 at certain horizontal and vertical rotational angles 30, 32, the pattern indicating the orientation information 34 corresponding to the certain horizontal and vertical rotational angles 30, 32. The lens layer may also refract visible light from other patterns (e.g., corresponding to other viewpoints) away from, for example, the camera 20, thus preventing or blocking the camera 20 from viewing the other patterns. FIG. 9 is a schematic diagram of the orientation tag 14 of FIG. 1 providing different orientation information 34 based on different angles at which the orientation tag 14 is viewed using a lens layer 120, according to an embodiment of the present disclosure. The lens layer 120 may include lens or visual alignment elements 122 that refract viewing of the patterns (e.g., 72B, 72C) other than the certain pattern (e.g., 72A) away from the camera 20, while refracting the certain pattern indicating the orientation information 34 toward the camera 20.

For example, the lens elements 122 may refract viewing of the patterns 72B, 72C from the camera's view 104 (e.g., when the camera 20 is in the first position 74 as shown in FIG. 7), while refracting viewing of the pattern 72A to the camera's view 104. Similarly, the lens elements 122 may refract viewing of the patterns 72A, 72C from the camera's view 106 (e.g., when the camera 20 is in the second position 76 as shown in FIG. 7), while refracting viewing of the pattern 72B to the camera's view 106. Moreover, the lens elements 122 may refract viewing of the patterns 72A, 72B from the camera's view 108 (e.g., when the camera 20 is in the third position 78 as shown in FIG. 7), while refracting viewing of the pattern 72C to the camera's view 108. In this manner, the lens elements 122 may enable viewing of a pattern that communicates orientation information of the orientation tag 14 corresponding to a viewer viewpoint to a viewer, while preventing other orientation information (e.g., corresponding to other viewpoints) from being viewed by the viewer.

The lens elements 122 may include any suitable material, shape, and/or dimensions to refract viewing of the patterns 72 as desired. For example, the lens elements 122 may be made of glass, plastic, polycarbonate, and the like. The lens elements 122 may be convex, concave, spherical, half-spherical, and so on.

Figure 10:
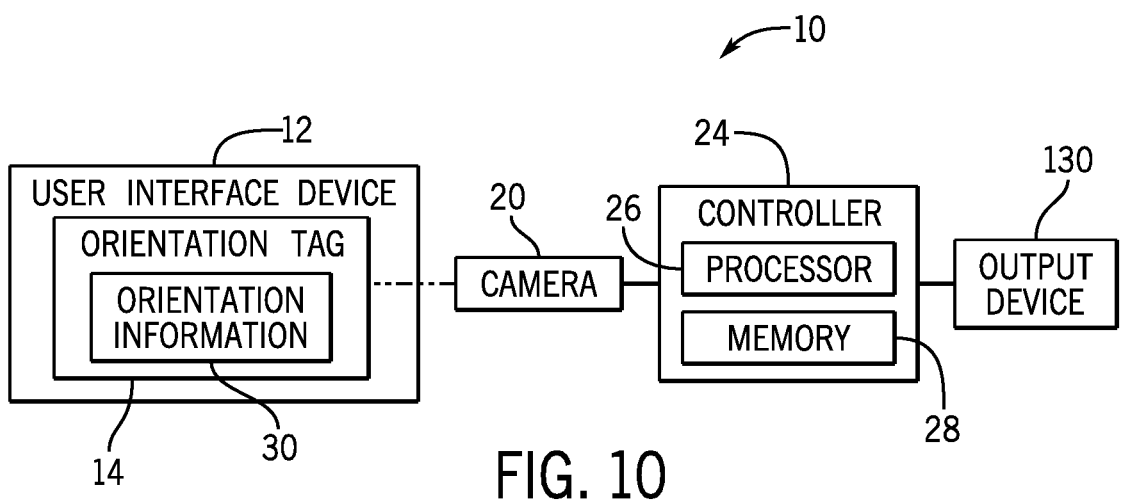
FIG. 10 is a block diagram of the theme park attraction system of FIG. 1, according to an embodiment of the present disclosure.

FIG. 10 is a block diagram of the theme park attraction system 10 of FIG. 1, according to an embodiment of the present disclosure. Certain components of the theme park attraction system 10 (e.g., the user interface device 12, the camera 20, and/or the controller 24) may be referred to as an orientation detection system. As illustrated, the camera 20, which may be communicatively coupled to the controller 24, may capture an image of the user interactive device 12. The image may include the orientation tag 14. The controller 24 may identify the orientation tag 14 in the image using, for example, image recognition techniques. The controller 24 may then determine the orientation information 34 provided by the orientation tag 14. For example, the orientation tag 14 may encode the orientation information 34 in a QR Code® 23. The controller 24 may thus decode the QR Code® 23 using pattern recognition techniques (e.g., QR Code® recognition techniques) to determine the orientation information 34, including the horizontal rotational angle 30, the horizontal rotational direction 54, the vertical rotational angle 32, and the vertical rotational direction 56. In some embodiments, the theme park attraction system 10 may include image processing circuitry that deciphers the orientation tag 14 (e.g., in the form of text, a barcode, the QR Code® 23). Moreover, the controller 24 may determine the size (e.g., width 38 and length 40) of the orientation tag 14 in the image (e.g., the number of pixels in the image correlating with the width 38 and length 40 of the orientation tag 14). Based on the known width 38 and length 40 of the orientation tag 14 and the number of correlating pixels, the controller 24 may determine the distance away that the camera 20 is from the orientation tag 14 (e.g., a depth measurement that may be part of the depth information), to facilitate determining both the orientation and the position of the orientation tag 14, and thus the orientation and the position of the user interactive device 12.

The controller 24 may also be communicatively coupled to an output device 130 (e.g., an animated figure, an electronic display, a speaker), and instruct the output device 130 to output a user interactive experience (e.g., an action, image, video, audio data, and so on) based on the orientation information 34. While the output device 130 is illustrated as separate from the user interactive device 12, in some embodiments, the output device 130 may be part of the user interactive device 12 (e.g., a speaker, electronic display, light output device, or actuator of the user interactive device 12). As an example, the output device 130 may be an electronic display (e.g., mounted on a wall or an augmented reality display) that, for example, displays one or more virtual objects (e.g., one or more swords) correlated to one or more orientation tags 14 of one or more user interactive devices 12, such that moving the one or more user interactive devices 12 may cause the displayed one or more virtual objects to move around due to movement of the one or more orientation tags 14. As another example, the output device 130 may be an animated object (e.g., a robot or otherwise animated figure) of an attraction, and, in response to determining that a user interactive device 12 is being pointed at the output device 130 via the orientation of the orientation tag 14, the animated object may perform a user interactive action (e.g., wag a tail, fall over, wave hello). As yet another example, the user interactive device 12 may be a virtual reality headset to which the orientation tag 14 is affixed, and the output device 130 may be a display of the virtual reality headset. The user may wear the user interactive device 12, move their head (e.g., left and right), and, in response, the display may display video data corresponding to the user's head movement (e.g., providing the illusion that the user is looking around in a virtual world).

The controller 24 may be communicatively coupled to the camera 20 and/or the output device 130 by any suitable means, such as via wired communication or over a communication network using a wireless communication protocol or technology (e.g., radio, Bluetooth, WiFi, infrared, Ethernet, Thread, ZigBee, Z-Wave, KNX, mobile, and/or microwave).

Figure 11:
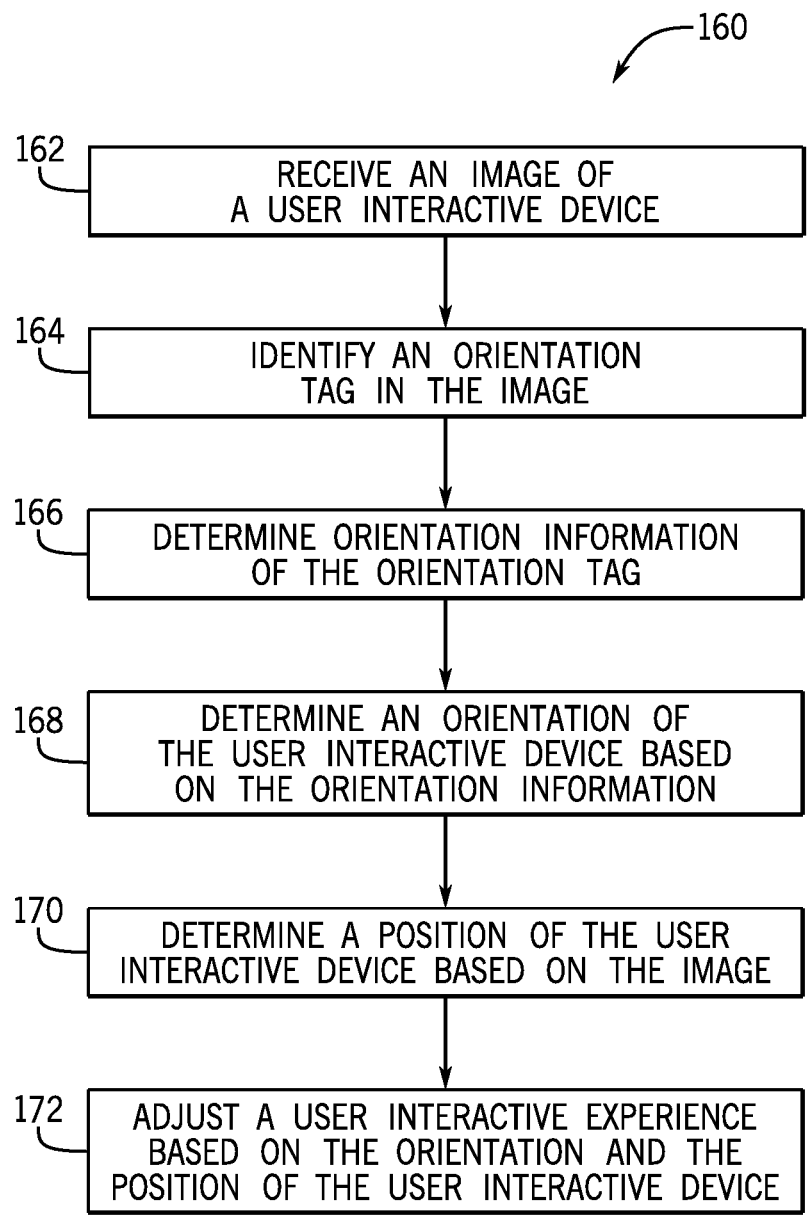
FIG. 11 is a flow diagram of a process for determining an orientation and position of the user interactive device, according to an embodiment of the present disclosure.

With the preceding in mind, FIG. 11 is a flow diagram of a process 160 for determining an orientation and position of the user interactive device 12, according to an embodiment of the present disclosure. The process 160 may be performed by any suitable system that may identify the orientation tag 14 in an image of the user interactive device 12 and determine the orientation information in the orientation tag 14. For example, the camera 20, the controller 24, the processor 26, and/or the output device 150 of the theme park attraction system 10 may perform the process 160. While the process 160 is described using steps in a specific sequence, it should be understood that the present disclosure contemplates that the described steps may be performed in different sequences than the sequence illustrated, and certain described steps may be skipped or not performed altogether. In some embodiments, the process 160 may be implemented by executing instructions stored in a tangible, non-transitory, computer-readable medium, such as the memory device 28, using a processor, such as the processor 26.

As illustrated, in process block 162, the processor 26 receives an image of the user interactive device 12. In particular, the camera 20 may capture the image of the user interactive device 12 (e.g., as held by the user 42), and send the image to the controller 24 and the processor 26 in particular. The processor 26, which may be resident in the controller 24, may thus receive the image (e.g., data indicative of captured imagery).

In process block 164, the processor 26 identifies the orientation tag 14 of the user interactive device 12 in the image. In particular, the processor 26 may use pattern and/or image recognition techniques (e.g., stored as instructions in the memory device 28) to detect a characteristic (e.g., a shape, color, other identifiable characteristic) of the orientation tag 14.

In process block 166, the processor 26 determines the orientation information 34 of the orientation tag 14 by reading the orientation information 34 made viewable by the orientation tag 14. In particular, the processor 26 may use image, pattern, and/or text recognition techniques (e.g., stored as instructions in the memory device 28) to determine the orientation information 34 of the orientation tag 14. For example, the orientation information 34 may be provided in text (e.g., for a horizontal rotational angle 30 of 15°, a horizontal rotational direction 54 of clockwise, a vertical rotational angle 32 of 170°, and a vertical rotational direction 56 of counterclockwise, the text may include "15° CW; 170° CCW"). As such, the processor 26 may use text recognition techniques to determine the orientation information 34. As another example, the orientation information 34 may be in the form of a QR Code® 23 and, as such, the processor 26 may use pattern recognition techniques (e.g., QR Code® 23 recognition techniques) to determine the orientation information 34.

In process block 168, the processor 26 determines an orientation of the user interactive device 12 and/or the orientation tag 14 based on the orientation information 34. In particular, the processor 26 determines the orientation of the orientation tag 14 using the orientation information 34, such as by determining the horizontal rotational angle 30, the horizontal rotational direction 54, the vertical rotational angle 32, and the vertical rotational direction 56 of the orientation tag 14. In some embodiments, the processor 26 may apply the orientation of the orientation tag 14 to the user interactive device 12. For example, the processor 26 may assume that the orientation of the user interactive device 12 is the same as the orientation of the orientation tag 14. In some embodiments, the processor 26 may apply known dimensions of the user interactive device 12 to the orientation information 34 provided by the orientation tag 14 determine the orientation of the user interactive device 12. For example, if the user interactive device 12 is a mobile device that is 7.5 cm wide by 18 cm long, and the orientation tag 14 is known to be applied to the center of the back of the mobile device and aligned with the mobile device, then the processor 26 may determine that the orientation of the user interactive device 12 is 7.5 cm wide by 18 cm long, centered at the center of the orientation tag 14, and aligned with the orientation tag 14.

In process block 170, the processor 26 determines a position of the user interactive device 12 and/or the orientation tag 14 based on the image. In particular, the processor 26 may determine the position of the orientation tag 14 based on correlating pixels in the image to the orientation tag 14. Moreover, the processor 26 may determine depth information of the orientation tag 14. In particular, the processor 26 may determine the size (e.g., the width 38 and the length 40 as shown in FIG. 1) of the orientation tag 14 in the image (e.g., the number of pixels in the image correlating with the width 38 and length 40 of the orientation tag 14). Based on the known width 38 and length 40 of the orientation tag 14 and the number of correlating pixels, the processor 26 may determine the distance away that the camera 20 is from the orientation tag 14 (e.g., a depth measurement that may be part of the depth information).

In process block 172, the processor 26 adjusts or provides a user interactive experience based on the orientation and/or the position of the user interactive device 12 and/or the orientation tag 14. In particular, the memory device 28 may store instructions to adjust or output a user interactive experience in response to the user interactive device 12 and/or the orientation tag 14 being in certain orientations and/or positions. The processor 26 may determine whether the orientation and/or the position of the user interactive device 12 and/or the orientation tag 14 correlates to any stored orientations and/or positions, and, if so, the processor 26 may adjust or instruct the output device 150 to output the user interactive experience corresponding to the orientation and/or the position of the user interactive device 12 and/or the orientation tag 14.

Figure 12:
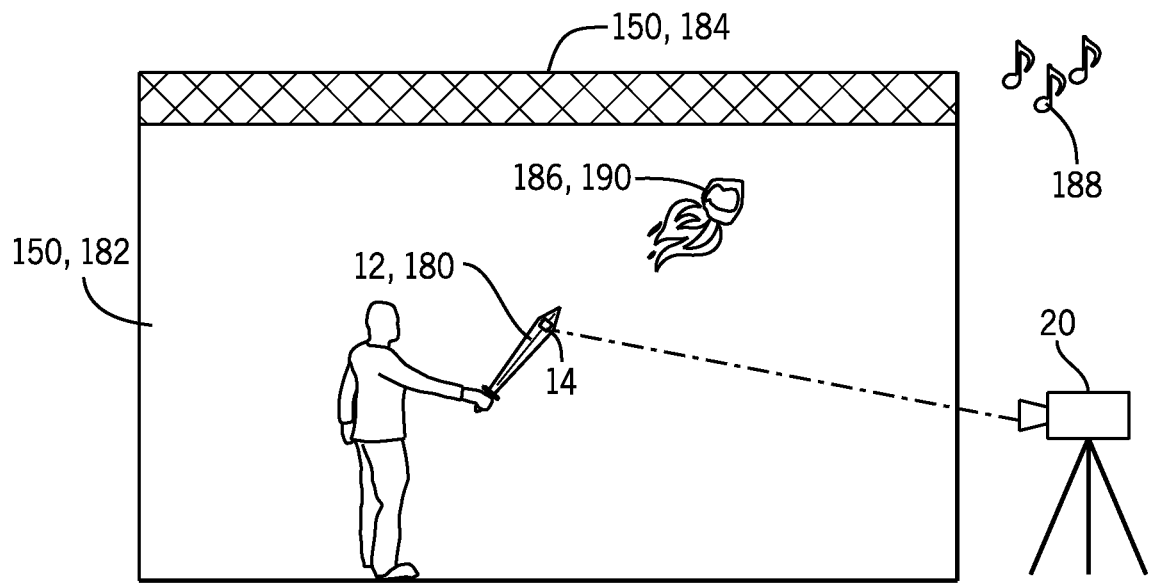
FIG. 12 is a schematic diagram of the user interactive device of FIG. 1 in the form of a handheld device and output devices in the form of an electronic display and speaker, according to an embodiment of the present disclosure.

For example, FIG. 12 is a schematic diagram of the user interactive device 12 of FIG. 1 in the form of a handheld device 180 (e.g., a toy sword), and output devices 150 in the form of an electronic display 182 and speaker 184 outputting video data 186 and audio data 188 based on the orientation and/or position of the handheld device 180 and/or the orientation tag 14, according to an embodiment of the present disclosure. In particular, the orientation tag 14 is affixed to the handheld device 180, and the processor 26 may determine the orientation and/or the position of the handheld device 180 and/or the orientation tag 14 as described above. If the processor 26 determines that the orientation and/or the position of the handheld device 180 and/or the orientation tag 14 correlates to outputting the video data 186 and/or the audio data 188 (e.g., as stored in the memory device 28), then the processor 26 instructs the display 182 to output the video data 186 (e.g., playing a video of a fireball 190 appearing to shoot out from the handheld device 180) and/or the speaker 184 to output the audio data 188 (e.g., a fireball sound effect).

Moreover, in some embodiments, the processor 26 may determine to output certain video data based on a partial orientation tag 14. For example, if the handheld device 180 is a toy gun, pulling a trigger may partially block the orientation tag 14, while the orientation tag 14 may remain unblocked if the trigger is not pulled. As such, if the processor 26 first receives an image of the unblocked orientation tag 14, and then an image of the blocked orientation tag 14, then the processor 26 may instruct the display 182 and the speaker 184 to output video data and audio data corresponding to firing the toy gun. In some embodiments, the display 182 and/or the speaker 184 may be part of a virtual or augmented reality head-mounted device, and output the video data 186 and/or the audio data 188 as part of the virtual or augmented reality experience provided by the head-mounted device.

Figure 13:
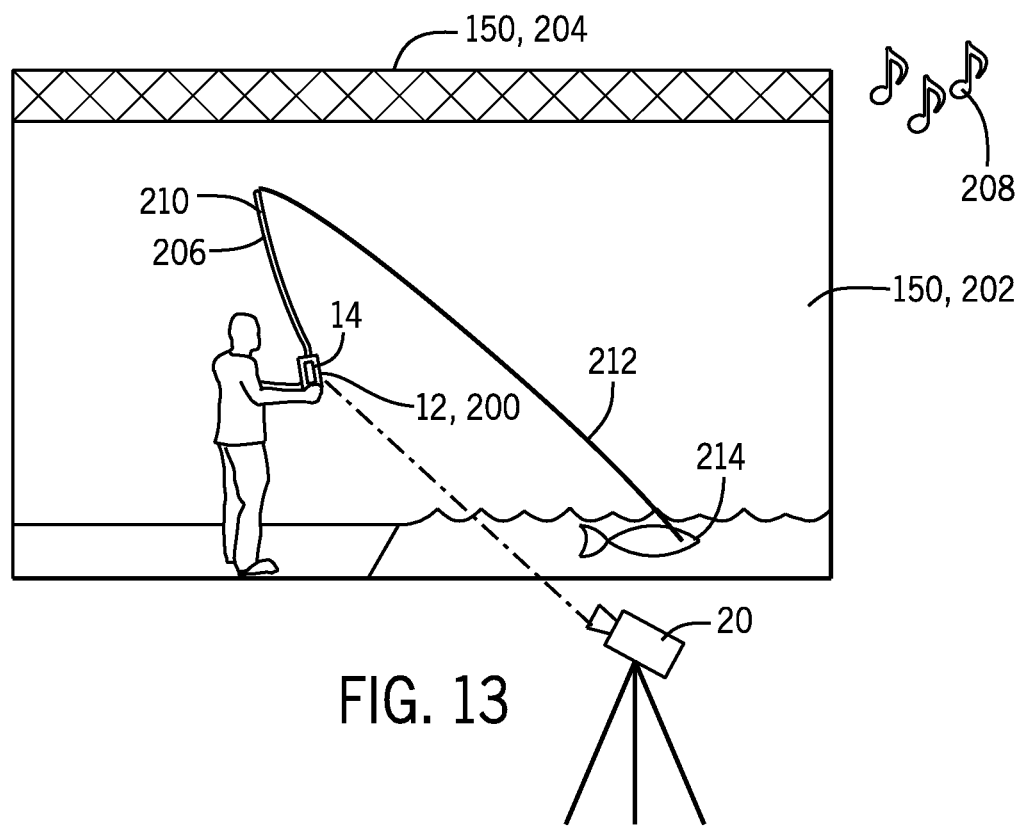
FIG. 13 is a schematic diagram of the user interactive device of FIG. 1 in the form of a mobile device and output devices in the form of an electronic display and speaker, according to an embodiment of the present disclosure.

As another example, FIG. 13 is a schematic diagram of the user interactive device 12 of FIG. 1 in the form of a mobile device 200, and output devices 150 in the form of an electronic display 202 and speaker 204 outputting video data 206 and audio data 208 based on the orientation and/or position of the mobile device 200 and/or the orientation tag 14, according to an embodiment of the present disclosure. In particular, the orientation tag 14 is affixed to the mobile device 200, and the processor 26 may determine the orientation and/or the position of the mobile device 200 and/or the orientation tag 14 as described above. If the processor 26 determines that the orientation and/or the position of the mobile device 200 and/or the orientation tag 14 correlates to outputting the video data 206 and/or the audio data 208 (e.g., as stored in the memory device 28), then the processor 26 instructs the display 202 to output the video data 206 (e.g., a fishing pole 210 extending from the mobile device 200, a fishing line 212 extending from the fishing pole 210, and a fish 214 caught on the fishing line 212) and/or the speaker 204 to output the audio data 208 (e.g., a sound effect of the fishing line 212 being pulled by the fish 214). In some embodiments, the display 202 and/or the speaker 204 may be part of a virtual or augmented reality head-mounted device, and output the video data 206 and/or the audio data 208 as part of the virtual or augmented reality experience provided by the head-mounted device.

Figure 14:
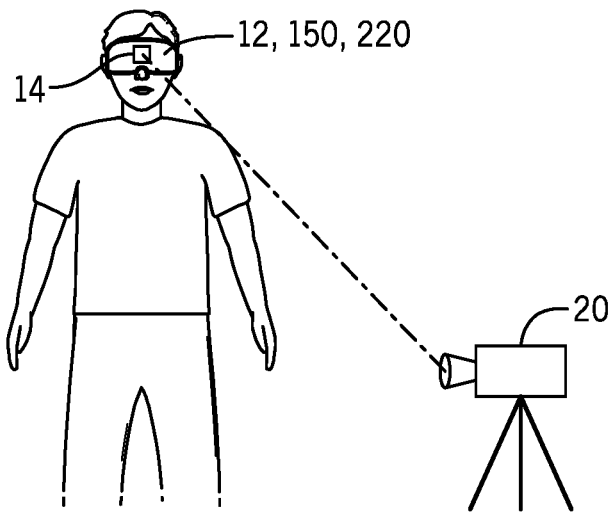
FIG. 14 is a schematic diagram of the user interactive device of FIG. 1 in the form of a head-mounted device and an output device in the form of an electronic display of the head-mounted device, according to an embodiment of the present disclosure.

As yet another example, FIG. 14 is a schematic diagram of the user interactive device 12 of FIG. 1 in the form of a head-mounted device 220, and the output device 150 in the form of an electronic display of the head-mounted device 220 outputting video data based on the orientation and/or position of the head-mounted device 220 and/or the orientation tag 14, according to an embodiment of the present disclosure. In particular, the orientation tag 14 is affixed to the head-mounted device 220, and the processor 26 may determine the orientation and/or the position of the head-mounted device 220 and/or the orientation tag 14 as described above. If the processor 26 determines that the orientation and/or the position of the head-mounted device 220 and/or the orientation tag 14 correlates to outputting the video data (e.g., as stored in the memory device 28), then the processor 26 instructs the display of the head-mounted device 220 to output the video data (e.g., looking around a virtual world).

Figure 15:
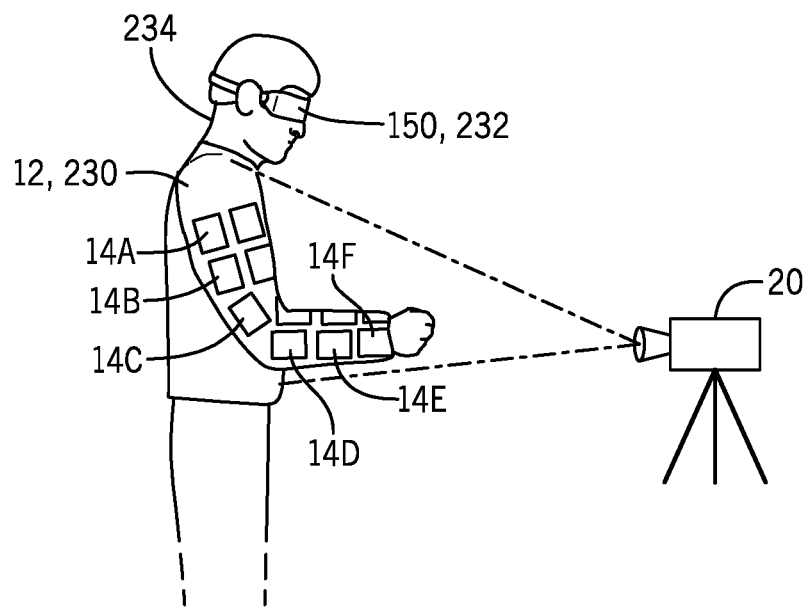
FIG. 15 is a schematic diagram of the user interactive device of FIG. 1 in the form of a flexible, wearable material and an output device in the form of an electronic display of a head-mounted device, according to an embodiment of the present disclosure.

As another example, FIG. 15 is a schematic diagram of the user interactive device 12 of FIG. 1 in the form of a flexible, wearable material 230, and the output device 150 in the form of an electronic display of a head-mounted device 232 outputting video data based on the orientation and/or position of the wearable material 230 and/or orientation tags (e.g., 14A-F), according to an embodiment of the present disclosure. In particular, the orientation tags 14 (including 14A-F) are affixed to the wearable material 230, and may be displaced with the wearable material 230 as the wearer 234 moves their arm. The wearable material 230 may be any suitable material that the orientation tags 14 may be affixed to and worn by the wearer 234, such as cloth, polyester, cotton, wool, denim, and so on. The processor 26 may determine the orientations and/or the positions of the orientation tags 14A-F as described above, and map or determine the orientation and/or position of the wearable material 230 based on the orientations and/or positions of the orientation tags 14A-F. If the processor 26 determines that the orientation and/or the position of the wearable material 230 and/or the orientation tags 14A-F correlates to outputting the video data (e.g., as stored in the memory device 28), then the processor 26 instructs the display of the head-mounted device 232 to output the video data (e.g., a virtual arm of the wearer 234).

In this manner, the process 160 may enable the processor 26 to determine the an orientation and position of the user interactive device 12 and/or the orientation tag 14, and output a user interactive experience based on the orientation and position of the user interactive device 12 and/or the orientation tag 14.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. An orientation detection system, comprising:
an orientation detector including an image sensor and image processing circuitry; and
an orientation tag configured to be coupled to a user interactive device, the orientation tag comprising:
a first layer of visual data; and
a second layer of visual alignment features disposed over the first layer of visual data, wherein the visual alignment features are configured to reveal and block portions of the visual data with respect to a viewpoint of the image sensor, wherein different patterns of the visual data are observable to the image sensor, wherein each pattern of the different patterns corresponds to a relative orientation of the orientation tag with respect to the viewpoint, wherein the image processing circuitry is configured to identify an orientation of the orientation tag based on a pattern of different patterns of the visual data observed by the image sensor.

2. The orientation detection system of claim 1, wherein the visual alignment features are configured to physically block patterns of the different patterns of the visual data that do not correspond to the relative orientation of the orientation tag with respect to the viewpoint from being viewed by the image sensor.

3. The orientation detection system of claim 1, wherein the visual alignment features are configured to:
provide, via refraction, the pattern of different patterns of the visual data for observation by the image sensor from the viewpoint; and
block, via refraction, patterns of the different patterns of the visual data that do not correspond to the relative orientation of the orientation tag with respect to the viewpoint from being viewed by the image sensor.

4. The orientation detection system of claim 1, wherein each pattern of the different patterns comprises a barcode or a Quick Response (QR) code that is decipherable by the image processing circuitry to represent a horizontal rotational angle and a vertical rotational angle of the orientation tag.

5. The orientation detection system of claim 1, wherein each pattern of the different patterns comprises text indicative of a horizontal rotational angle and a vertical rotational angle of the orientation tag.

6. An entertainment system, comprising:
an orientation tag of a user interactive device, the orientation tag comprising a plurality of visual patterns and a visual alignment feature that limits viewing of the plurality of visual patterns based on a viewing orientation of the orientation tag;
a camera configured to capture an image of the orientation tag of the user interactive device; and
a controller having processing circuitry and a memory, the memory storing machine-readable instructions configured to cause the processing circuitry to:
identify the orientation tag of the user interactive device in the image; and
determine an orientation of the orientation tag based on orientation information associated with a visual pattern of the plurality of visual patterns captured in the image.

7. The entertainment system of claim 6, wherein the orientation information comprises a horizontal rotational angle and a vertical rotational angle of the orientation tag.

8. The entertainment system of claim 7, wherein the machine-readable instructions are configured to cause the processing circuitry to determine the orientation of the orientation tag by applying the horizontal rotational angle and the vertical rotational angle to the orientation tag in the image.

9. The entertainment system of claim 6, wherein the machine-readable instructions are configured to cause the processing circuitry to determine a position of the orientation tag in the image.

10. The entertainment system of claim 9, comprising an output device, wherein the machine-readable instructions are configured to cause the processing circuitry to instruct the output device to output a user interactive experience based on the orientation and the position of the orientation tag.

11. The entertainment system of claim 10, wherein the output device comprises an electronic display, wherein the memory stores data correlating the orientation of the orientation tag to video data, and wherein the machine-readable instructions are configured to cause the processing circuitry to instruct the electronic display to display the video data based on the orientation of the orientation tag.

12. The entertainment system of claim 10, wherein the output device comprises a speaker, and wherein the memory stores data correlating the orientation of the orientation tag to audio data, and wherein the machine-readable instructions are configured to cause the processing circuitry to instruct the speaker to output the audio data based on the orientation of the orientation tag.

13. The entertainment system of claim 6, wherein the user interactive device comprises a mobile device, and wherein the orientation tag is affixed to the mobile device.

14. A user interactive device, comprising:
an orientation tag comprising:
a first layer comprising a plurality of patterns, wherein each pattern of the plurality of patterns indicates a set of orientation information; and
a second layer disposed over the first layer, wherein the second layer comprises a plurality of elements configured to:
enable a corresponding pattern of the plurality of patterns, wherein the corresponding pattern corresponds to a viewpoint of the orientation tag to be viewed from the viewpoint; and
prevent non-corresponding patterns of the plurality of patterns, wherein the non-corresponding patterns do not correspond to the viewpoint of the orientation tag from being viewed from the viewpoint.

15. The user interactive device of claim 14, comprising a handheld device.

16. The user interactive device of claim 14, comprising a head-mounted device.

17. The user interactive device of claim 16, wherein the head-mounted device comprises a display, and wherein the display is configured to output video data based on the set of orientation information indicated by the corresponding pattern.

18. The user interactive device of claim 14, comprising a wearable material, wherein the wearable material comprises a plurality of orientation tags, wherein the plurality of orientation tags comprises the orientation tag.

19. The user interactive device of claim 14, comprising a light source, wherein the light source is configured to emit light to illuminate the plurality of patterns.

20. The user interactive device of claim 19, wherein the light source comprises a liquid crystal display, a light-emitting diode, or an organic light-emitting diode.

21. The user interactive device of claim 19, wherein the light source comprises reflective material.

* * * * *